Figure 1:
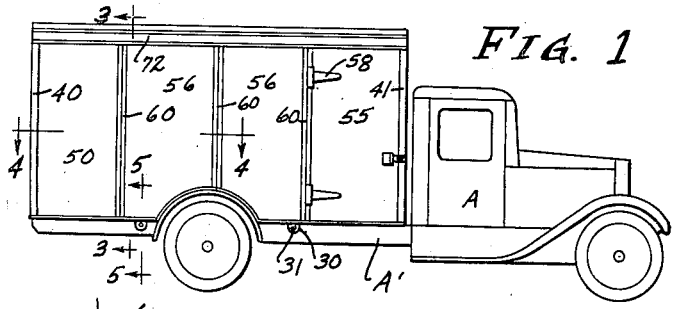

Nov. 30, 1937. B. F. FITCH 2,100,323
AUTOMOTIVE TRUCK BODY
Filed Dec. 6, 1933 2 Sheets-Sheet 1

Inventor
Benjamin F. Fitch,
By Bales, Golrick & Tear
Attorneys

Nov. 30, 1937.  B. F. FITCH  2,100,323
AUTOMOTIVE TRUCK BODY
Filed Dec. 6, 1933    2 Sheets-Sheet 2
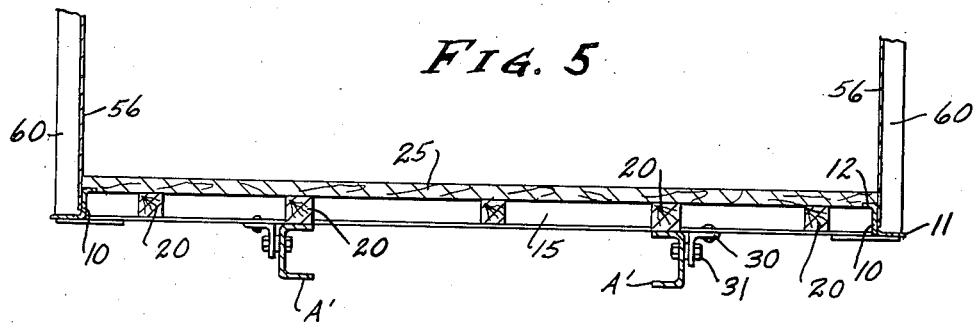
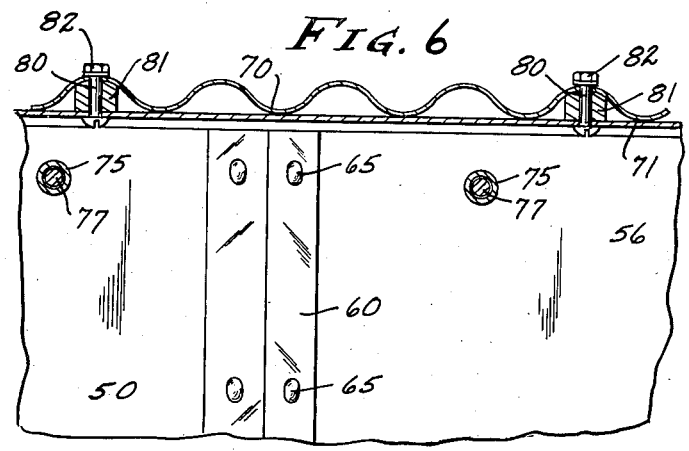
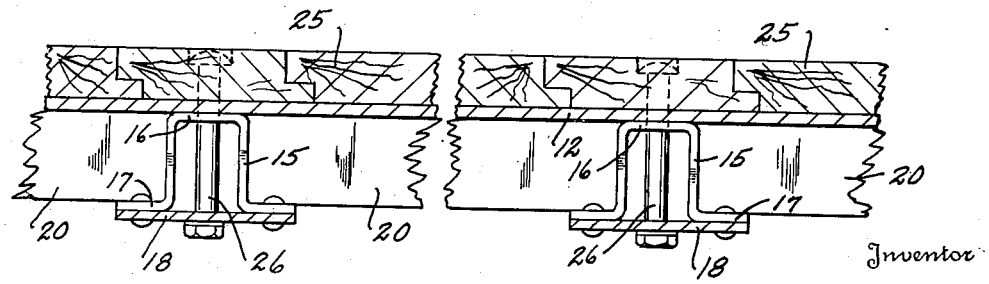
Inventor
Benjamin F. Fitch
By Watts, Golnick & Hearn
Attorneys Patented Nov. 30, 1937

2,100,323

UNITED STATES PATENT OFFICE 2,100,323

AUTOMOTIVE TRUCK BODY

Benjamin F. Fitch, Greenwich, Conn., assignor to Motor Terminals Company, New York, N. Y., a corporation of Delaware Application December 6, 1933, Serial No. 701,170

2 Claims. (Cl. 296—28)

This invention relates to a metal body adapted to be mounted on the chassis of an automobile truck to provide an efficient and convenient delivery vehicle. Among the objects of the invention are cheapness of construction and ready assemblage of the parts, enabling complete fabrication at the mill and shipping in knock-down form for assemblage where desired.

The invention is concerned particularly with the construction of the roof and its junction with the upper end of the side wall, enabling efficient attachment of the roof to the side wall and still ready separation when desired.

A preferred form of my invention is illustrated in the drawings hereof and is hereinafter more fully described.

Figure 2:
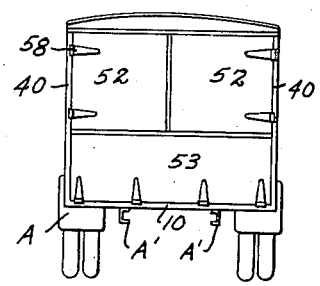
Figure 4:
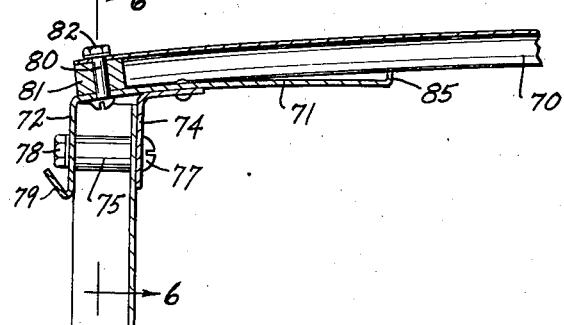
Figure 3:
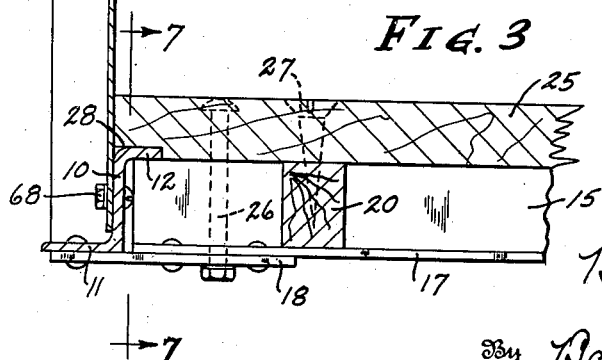

In the drawings, Fig. 1 is a side elevation of my body mounted on an automobile truck; Fig. 2 is a rear view of such mounted body; Fig. 3 is a vertical section, as indicated by the line 3—3 on Fig. 1, but on a larger scale; Fig. 4 is a horizontal section on a scale similar to Fig. 3, as indicated by the line 4—4 on Fig. 1; Fig. 5 is a vertical transverse section through the lower portion of the body and sills of the chassis, as indicated by the line 5—5 on Fig. 1; Fig. 6 is a vertical section through the roof at one of the eaves, as indicated by the line 6—6 on Fig. 3; Fig. 7 is a vertical section through the floor as indicated by the line 7—7 on Fig. 3.

The floor frame of the body is made by four structural shapes of Z-bar form secured together at their ends to make an open rectangle corresponding to the sides and ends of the body. These shapes for the sides, indicated at 10 in Figs. 3 and 5, and the members at the ends are similar. The shapes are Z form in cross-section having a vertical web, a comparatively wide horizontal outwardly extending lower flange 11, and a comparatively narrow, inwardly extending upper flange 12. Extending transversely of the body are beams 15 in the form of downwardly facing trough-shaped members having flattened tops 16 and outwardly facing bottom edge flanges 17. The height of these beams is substantially the same as that of the web of the Z-bar side sills, and the beams are secured to such side sills by splice plates 18, shown as riveted to the flanges 17 and the flanges 11 of the Z-bar.

Between the cross beams 15 are wooden beams 20, reaching from one beam 15 to the next, and resting on the flanges 17 thereof. These wooden beams 20 align throughout the length of the body base. There are several rows of such beams, five being shown in Fig. 5. The floor comprises ship-lap planking 25 with the strips extending transversely, such planking resting on the flattened tops of the metal cross-beams 15 and on the tops of the wooden beams 20, the floor planking being secured to the metal beams by bolts 26, extending downwardly through the planking and through the plates 18, secured to the underside of the cross beam flanges 17. Intermediately the floor planking is secured by wood screws 27 or other fasteners to the longitudinal wooden beams 20. Adjacent the edges the planking is rabbeted, as shown at 28, to receive the inturned flanges 12 of the side and end beams.

It will be seen that the construction just described provides a simple and light and readily assembled floor frame. This floor frame is intended to be mounted directly on the chassis sills of the truck A. As indicated in Fig. 6, the cross-beams 15 rest on the truck sills A1, which are shown as inwardly facing channels. Two of the rows of longitudinal wooden beams 20 are so located that they engage the top of these chassis sills. The body is secured to the chassis sills by angle clips 30 riveted to flanges 17 of the cross beams and bolted as at 31 to the webs of the chassis sills. This direct support of the floor beams on the chassis sills without requiring an intermediate body base simplifies and cheapens the construction, and lowers the center of gravity of the body.

At the four corners of the body, I provide vertical angle beams 40, 41 to which side and end walls are secured. In the particular embodiment shown in the drawings the rearmost side wall plates 50 are secured to the side flanges of the rear vertical angles 40, while a continuous front plate of the body, not specifically shown, is secured to the end flanges of the corresponding front angles 41. At the rear I have illustrated upper doors 52, hinged to the inwardly directed flanges of the vertical corner bars 40, and a lower door 53, hinged to the web of the end Z-bar 10. At the forward ends of the sides I have also illustrated doors 55, which coact with the side flanges of the corner angles 41. Between the door 55 and the rear side plate 50 are shown two intermediate side plates 56. Successive side plates are connected by vertical external brace bars 60, as about to be described, the forward brace bars, in the embodiment shown, forming the support for the hinges 58 of the side doors 55.

The side wall construction, which is also an important feature of my invention, is illustrated specifically in Fig. 4. As there shown, each of the side plates 50 or 56 is flanged outwardly at an angle of 45° adjacent its edge, as illustrated at 61. The brace bars 60 comprise vertical angle bars with their flanges of equal size and each located at 45° to the side. These brace bars are on the exterior of the side and snugly engage the outer faces of the outwardly bent side flanges 61. The angle bars are secured to the side plates preferably by removable fasteners, shown as comprising bolts 65 having heads on the exterior and receiving nuts 66 on the interior. These nuts are outside of the vertical plane defining the inner surface of the side wall. At their lower ends, the side bars are protected by the outward flanges 12 of the floor frame Z-bars, and at their upper ends by a peculiar cornice construction, which also provides means for attaching the roof, as hereinafter described.

The side construction just described has a number of advantages. It enables very simple assemblage of the parts with no other tools than a screw driver and a wrench, and this contributes to the feasibility of shipping the body knocked-down and allowing its assemblage at the point of use. When assembled there is nothing projecting inwardly beyond the surface of the side walls, so that the interior is substantially flush and may be loaded tight against the side walls without construction of the interior or danger of damage to the contents. The external members by being inclined in each direction are much less liable to injury from external blows or so-called side swiping than if they projected at right angles to the body.

In case of injury to the external braces or to the side sheets, the bolt-and-nut attaching method described enables any side bar or side sheet to be readily removed for replacement. The side sheets are secured at their lower ends to the vertical webs of the Z-bars also by removable bolts, indicated at 68 in Fig. 3, and a similar construction is employed at the front end of the body.

The roof proper comprises a corrugated metal member 70, having the length of the valleys and ridges extending from one side of the body to the other. Adjacent its side edges this roof rests on a substantially horizontal portion 71 of metal eave plates, which are secured to the sides and extend inwardly therefrom, the plates having downwardly bent portions 72, which extend vertically and bear against the ridges of the side angles 60. There are also inner angle plates 74 which have substantially horizontal flanges riveted to the portion 71 of the main plates and vertical flanges lying along the inner side of the side plates. This cornice makes in effect a downwardly facing trough embracing the top of the side and protecting it.

Suitable distance sleeves 75 extend between the outer face of the side plates 50, 56, and the inner face of the down-turned eave flange 72. These sleeves are located on opposite sides of the vertical angle bars 60 and are occupied by bolts 77, which pass through registering openings in the down-turned internal flanges 74, the side plates, the sleeves and the external flange 72, and finally receive nuts 78.

The lower edge of the downwardly extending flange 72 is shown as turned upwardly at 79 to provide a draining trough leading from one end of the body to the other. This is of special use over the door 55, preventing seepage of water into the upper end thereof. That door may have its top just below the plane of the bottom of the side flange to clear the same when the door opens. When the door is closed the side space above it is filled by a narrow strip of side wall forming a lintel.

The corrugated roof is bolted at intervals to the inturned eave plate 71 beyond the side of the body; each bolt, of which one is indicated at 80 in Fig. 3, passes through the corrugated roof, through a filler block 81, and through the inturned sheet 71 between the flange 72 and the side of the body. This bolt is shown as having a screw driver slot on its lower end and receiving a nut 82 on its upper end.

The inturned sheet 71 provides a stiffening web for the top of the body side. It extends inwardly far enough to receive and shed to the exterior any water passing into the open ends of the roof corrugations. At the inner edge of this sheet there is a short flange 85 extending upwardly and bearing against the underside of the roof. This flange stiffens the web, braces the roof, and with the adjacent portion of the sheet forms a trough to receive melted snow. The roof corrugations may accordingly, if desired, be left open to provide ventilation. On the other hand, they may be, if desired, choked, as by the insertion of mineral wool, and in that case the flange 85 forms an abutment limiting such inserted material.

It will be seen from the description given that my body is composed of sheet metal and structural shapes and wooden flooring members, all cheaply constructed. It will be seen further that the body may be readily knocked down for shipping or separated for repair. The removal of the bolts 80 frees the roof, while the removal of the bolts 68 detaches the sides and closed end wall from the floor frame. The removal of the bolts 65 allows the sides to be separated into units, and the removal of the hinge pins will free the doors. The vertical rear angle bars 40 are preferably permanently attached to the endmost side plates 50, while the forward angle bars 41 may be attached to the front sheeting, not shown. The removal of the bolts 77 enables the entire cornice to be removed from the sides. Thus, the side and end sheets, the side bars, the doors and the cornices may be all mounted on the floor frame and surmounted by the roof, making a convenient, compact package for shipping.

In assembly of the body, the floor frame may be readily attached to the chassis sills by the bolts 31; then the forward end and the side sheets secured to the floor frame, and after the side bars are attached, the cornice is put in place. Then the roof may be put on and finally the doors mounted by their hinge pins.

The arrangement of two opposite side doors adjacent the front, and rear doors filling the entire rear end, not only allows the greatest access to the interior, but also enables me to attach the forward corner angle bars permanently to the body front, and the rear corner angle bars permanently to the adjacent side sheets, as the other flanges of their angle bars coact merely with removable doors.

I claim:

1. In a vehicle body having a base and sheet metal side wall panels extending upwardly therefrom and having upright external braces connecting adjacent panels, a roof carried by said side walls comprising a sheet of corrugated metal with the lengths of the valleys and ridges extending transversely of the body, a cornice structure comprising an outwardly sloping plate secured to the underside of said roof and extending inwardly over the interior of the body from the plane of the panels and providing horizontally facing ventilation openings between the plate and the corrugations of said roofing, and downwardly extending flanges carried by said plate depending in embracing relation to the upper ends of the braces and the upper margins of the panels respectively, said outwardly sloping plate extending inwardly, as aforesaid, a distance which, is several times as great as the depth of the valleys in the corrugated sheet.

2. In a vehicle body having a base and sheet side walls extending upwardly therefrom, an inner cornice member adjacent the upper portion of one of said side walls, said member having a vertical flange in face to face contact with the upper side wall and a flange extending inwardly horizontally at the top thereof, an outer cornice member having a flat portion secured to the horizontal flange of said first-mentioned cornice member and a vertical flange extending downwardly on the outside of and spaced from said side wall, a reinforcing member bearing against and fastened to said side wall, having its upper portion lying between said vertical flanges, means to secure said two vertical flanges and said side wall together, a corrugated roof portion overlying the horizontal top of said outermost flange, said roof portion extending substantially horizontally clear to its lateral edge, and means to detachably secure the roof to the horizontal portion of the outer cornice member while leaving corrugations of the roof open to the exterior.

BENJAMIN F. FITCH.